United States Patent [19]

Giannini et al.

[11] 4,107,415

[45] Aug. 15, 1978

[54] PROCESS FOR THE STEREOSPECIFIC POLYMERIZATION OF ALPHA-OLEFINS

[75] Inventors: Umberto Giannini; Antonio Cassatá; Paolo Longi; Romano Mazzocchi, all of Milan, Italy

[73] Assignee: Montecatini Edison S.p.A., Milan, Italy

[21] Appl. No.: 778,963

[22] Filed: Mar. 18, 1977

Related U.S. Application Data

[63] Continuation of Ser. No. 583,169, Jun. 3, 1975, abandoned, which is a continuation of Ser. No. 400,515, Sep. 25, 1973, abandoned.

[30] Foreign Application Priority Data

Sep. 26, 1972 [IT] Italy ................. 29676 A/72

[51] Int. Cl.$^2$ ..................... C08F 4/02; C08F 10/06
[52] U.S. Cl. ..................... 526/114; 252/429 B; 252/429 C; 526/97; 526/124; 526/125; 526/351; 526/903; 526/904; 526/906
[58] Field of Search ................. 526/125, 114

[56] References Cited

U.S. PATENT DOCUMENTS 3,238,146  3/1966  Hewett et al. .............. 526/125
3,278,511  10/1966  Langer .................. 526/159

FOREIGN PATENT DOCUMENTS 222,426    6/1959   Australia.
2,153,520  5/1972   Fed. Rep. of Germany.
1,135,976  12/1968  United Kingdom.
918,740    2/1963   United Kingdom.

Primary Examiner—Edward J. Smith

[57] ABSTRACT

Alpha-olefins $C_3$–$C_6$ are polymerized stereospecifically with the aid of catalysts obtained by mixing (a) a catalyst-forming component which is an addition and/or substitution product of an electron-donor compound (or a Lewis base) with an aluminum trialkyl, or an addition product of an electron-donor compound with an alkyl aluminum compound containing two or more Al - atoms bound to each other through an oxygen or nitrogen atom with (b) a supported catalyst-forming component which is the product obtained by contacting a titanium compound, preferably in the form of an addition product with an electron donor, with a carrier which is a mixture of an active anhydrous Mg or Mn dihalide and a solid organic material which is inert to all other components of the catalyst including the Mg or Mn dihalide carrier.

13 Claims, No Drawings

PROCESS FOR THE STEREOSPECIFIC POLYMERIZATION OF ALPHA-OLEFINS

This is a continuation of our application Ser. No. 583,169 filed June 3, 1975 (now abandoned) which was a continuation of our application Ser. No. 400,515 filed Sept. 25, 1973 (now abandoned).

Catalysts which exhibit remarkable activity in the stereospecific polymerization of alpha-olefins, and made up of the product obtained by mixing alkyl aluminum compounds at least partially complexed with electron-donor compounds with halogenated Ti compounds supported on Mg or Mn dihalides having particular characteristics have been disclosed by our group.

Those catalysts were found to be so active in the polymerization of the alpha-olefins that the conventional after-purification treatments of the polymers obtained, for the removal of catalyst residues therefrom, can be omitted.

However, the amount of inorganic halogen driving from the Mg or Mn dihalide used as the carrier or support can be sufficient to cause corrosion and other undesirable side-effects during transformation of the higher alpha-olefin polymers into manufactured articles under conventional conditions.

The problem is alleviated by replacing a portion of the Mg or Mn dihalide used as carrier with a solid inorganic inert compound of a metal other than Mg or Mn and belonging to Groups I to IV of the Mendelyeev Periodic Table.

It is possible, using the inorganic co-carriers or co-supports, to reduce the amount of Mg or Mn dihalide used without any appreciable reduction in the yield of polymer obtained when the carrier for the halogenated Ti compound consists entirely of the Mg or Mn dihalide in an activated state as a result of which it has particular characteristics. However, use of carriers or supports consisting of mixtures of activated Mg or Mn dihalide and the inert inorganic diluents can result in a decrease in the stereospecificity of the final catalysts and in the amount of crystalline alpha-olefin polymer comprised in the crude (total) polymerizate obtained, i.e., in an increase in the amount of atactic polymer comprised in the crude (total) polymerizate.

An object of this invention is to provide catalysts for the polymerization of the alpha-olefins using a support or carrier which is only in part an activated Mg or Mn dihalide but which exhibit essentially the same stereospecificity in the polymerization of alpha-olefins $C_3$-$C_6$ and give essentially the same yields as the catalysts in which the carrier or support for the Ti compound consists of an Mg or Mn dihalide in activated state.

This and other objects are accomplished by the invention in accordance with which the support or carrier utilized is a mixture of an activated Mg or Mn dihalide having particular characteristics and a solid organic substance which is inert to all of the other components of the catalyst including the active Mg or Mn dihalide with which it is used as co-carrier.

More specifically, the catalysts of this invention are prepared by mixing (a) a catalyst-forming component which is the addition and/or substitution product of an electron-donor compound (or a Lewis base) and an aluminum trialkyl, or the addition product of an electron-donor compound and an alkyl aluminum compound containing two or more Al-atoms bound to one another through an oxygen or nitrogen atom, this component (a) being characterized in that the amount of the organic aluminum compound present in the addition product with the electron-donor compound is from 0.01 to 1 mole per mole of the starting Al compound; with (b) a supported catalyst-forming component obtained by contacting (1) a halogenated compound of either bivalent, trivalent or tetravalent titanium, preferably in the form of an addition compound with an electron-donor, with (2) a carrier including an anhydrous Mg or Mn dihalide and a solid organic material which does not substantially interact with the anhydrous Mg or Mn dihalide or other component of the catalyst, said carrier and component (b) being characterized by a surface area larger than 3 $m^2/g$, or component (b) being characterized in that, in its X-ray powder spectrum, the diffraction lines which are most intense in the X-ray powder spectrum of the corresponding normal non-activated Mg or Mn dihalide, are replaced by a halo, component (b) being further characterized in that the Ti-compound content thereof, expressed as Ti-metal, is lower than 0.3 g atoms per mole of the total amount of the electron-donor compound contained in combined form in the catalyst.

As the solid organic constituent of the carrier which is inert to the Mg or Mn dihalide and other components there may be used both low molecular weight and polymeric compounds.

Suitable low molecular weight compounds include, for example, durene, anthracene, hexachlorobenzene, p-dichlorobenzene, acenaphthene, naphthalene and diphenyl.

Examples of suitable polymeric materials include polyethylene, polypropylene, polyvinyltoluene, polystyrene, polymethylmethacrylate, polyamides, polyesters and polyvinylchloride.

The presently preferred solid organic materials for use as co-carrier in the practice of this invention are durene, anthracene, naphthalene, p-dichlorobenzene, hexachlorobenzene, polyvinyltoluene, polystyrene, polypropylene, polyvinylchloride and polyethylene.

The amount of the solid organic substance which can be mixed with the anhydrous Mg or Mn dihalide, without sensibly affecting the activity of the catalyst as compared to a catalyst in which the support consists of the active Mg or Mn dihalide, can vary over a wide range and may be, for instance, between 10% and 90% by weight based on the combined weight of the anhydrous active Mg or Mn dihalide plus the solid organic compound.

Optionally, inert solid inorganic compounds may be used in the carriers, in addition to the Mg or Mn dihalides and solid organic compounds.

Suitable inert inorganic diluents of the carriers are selected from among compounds of metals belonging to Groups I to IV of the Mendelyeev Periodic Table and different from Mg and Mn. Examples include: LiCl, $CaCO_3$, $CaCl_2$, $SrCl_2$, $BaCl_2$, $Na_2SO_4$, $Na_2CO_3$, $TiO_2$, $B_2O_3$, $Al_2O_3$ and $SiO_2$. Such inorganic diluents of the carrier may be used in amounts generally comprised between 20% and 100% by weight with respect to the anhydrous Mg or Mn dihalide.

Any electron-donor (or Lewis base) capable of yielding addition and/or substitution compounds with the Al-alkyl compounds may be used to obtain catalyst-forming component (a) of the present catalysts.

Specific electron-donor compounds useful in preparing catalyst-forming component (a) include: amines, amides, ethers, esters, ketones, nitriles, phosphines, stibines, arsines, phosphoramides, thioethers, thioesters, aldehydes, alcoholates, amides and salts of organic acids of metals belonging to Groups I to IV of the Mendelyeev periodic table.

Specific examples of such compounds include: triethylamine, N,N,N',N'-tetramethylethylenediamine, N,N'-dimethylpiperazine, dimethyl ether, diethyl ether, dimethoxy-ethane, tetrahydrofuran, ethyl benzoate, ethyl acetate, acetone, acetophenone, benzonitrile, acetonitrile, tetramethylurea, veratrol, dimethyl maleate, diethyl carbonate, nitrobenzene, ethylsilicate, triethyl borate, lithium-butylate, dimethylaminophenyl-lithium, sodium-dimethylamide.

Very good results, as regards both activity and steriospecificity of the catalyst, have been achieved by using, as component (a) addition products of Al-trialkyls with electron-donor compounds consisting of esters, the most typical of which are: ethyl benzoate, ethyl p-methoxy-benzoate, diethyl carbonate, ethylacetate, dimethyl maleate, triethyl borate, ethyl-o-chlorobenzoate, ethyl naphthoate, ethyl toluate, ethyl p-butoxybenzoate, ethyl cyclohexanoate, ethyl pivalate, and of diamines, some examples of which are: N,N,N',N'-tetramethylethylene-diamine, 1,2,4-trimethylpiperazine.

The following Al-trialkyl compounds are particularly suited for use in preparing catalyst forming component (a):

Examples of other aluminium-trialkyl compounds are:

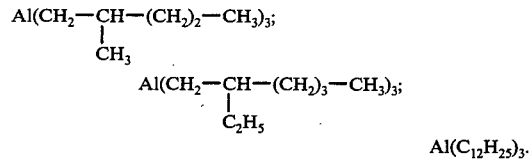

The organometallic compounds containing two or more aluminum atoms bound each other through an oxygen or nitrogen atom are obtained by reacting trialkyl aluminums with water, ammonia or a primary amine by known methods. Examples of such compounds include

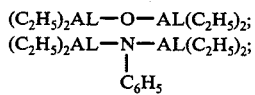

Component (a) of the catalyst can be prepared by several methods. The presently preferred method consists in pre-reacting the electron donor compound with the organic aluminum compound in appropriate molar ratio, before contacting it with component (b). The electron-donor compound/organic aluminum compound starting molar ratio varies, in general, between 0.1 and 1.0.

Another method of preparing component (a), and at the same time obtaining the Mg or Mn halide in an active form, consists in reacting an addition compound between the Mg and Mn halide and an electron-donor compound, with an aluminum-trialkyl compound employed in such amount that the Al-trialkyl/electron-donor compound molar ratio is higher than 1.0.

The electron-donor compounds utilizable for preparing component (b) may be the same esters already indicated for the preparation of component (a) or different compounds.

Also in this case, all electron-donor compounds capable of forming complexes with the halogenated Ti-compound may be used for preparing component (b). Diamines and estes of organic and inorganic oxygen-containing acids have given particularly good results.

Employable Ti-compounds may be a halogenated bi-, tri-, or tetravelent Ti-compound. Examples of such compounds are: Ti Cl$_4$, Ti Cl$_3$, TiI$_4$, Ti (OC$_3$H$_7$) Cl$_3$, Ti (OC$_4$H$_9$)$_2$ Cl$_2$, 3 Ti Cl$_3$, Al Cl$_3$, Ti[O—C(CH$_3$) = CH—CO—CH$_3$]$_2$ Cl$_2$, Ti [N(C$_2$H$_5$)$_2$] Cl$_3$, Ti[N(C$_6$H$_5$)$_2$] Cl$_3$, Ti (C$_6$H$_5$ COO) Cl$_3$. [N(C$_4$H$_9$)$_4$]$_2$TiCl$_6$, [N(CH$_3$)$_4$]Ti$_2$Cl$_9$, TiBr$_4$, TiCl$_3$OSO$_2$C$_6$H$_5$, LiTi(OC$_3$H$_7$)$_2$Cl$_3$.

Catalytic component (b) may be prepared according to various methods. The presently preferred method consists in contacting the Mg or Mn halide with the Ti-compound, which has been previously complexed with the electron-donor compound, and in effecting the contact under those conditions at which the product resulting therefrom has a surface area larger than 3 m$^2$/g and/or its X-ray spectrum exhibits a halo in place of the most intense diffraction lines typical of the normal, non-activated Mg or Mn dihalides.

This can be attained, for example, by co-grinding the carrier in the presence of the Ti-compound. Good results are achieved also by merely mixing the Ti-compound with the pre-activated Mg or Mn halide having a surface area larger than 3 m$^2$/g.

According to another method, which involves preparing the complex of Ti with the ester "in situ", the electron-donor compound suitable for forming component (a) is added either before or after the addition of the Al-alkyl to the previously supported Ti-compound.

Examples of useful addition compounds of Ti are: TiCl$_4$.C$_6$H$_5$COOC$_2$H$_5$; TiCl$_4$.2C$_6$H$_5$COOC$_2$H$_5$; TiCl$_4$.pCH$_3$—OC$_6$H$_4$COOC$_2$H$_5$; TiCl$_4$.C$_6$H$_5$NO$_2$; TiCl$_3$(CH$_3$)$_2$N—(CH$_2$)$_2$—N(CH$_3$)$_2$; TiCl$_4$.(CH$_3$)$_2$N(CH$_2$)$_2$N(CH$_3$)$_2$; TiCl$_4$.CH$_3$COC$_2$H$_5$; TiCl$_4$.2C$_4$H$_8$O; TiCl$_3$.C$_6$H$_5$COOC$_2$H$_5$.

The amount of Ti-compound present on the carrier is generally comprised between 0.1 and 10% by weight expressed as Ti-metal. The amount of Ti-compound contained in the catalyst and expressed as Ti-metal is lower than 0.3 g-atoms per mole of the total amount of the electron-donor compound present in combined form in the catalyst; preferably said amount is lower than 0.1 g-atoms, the preferred amount ranges from 0.05 to 0.005 g-atoms. The Al/Ti molar ratio is generally comprised between 10 and 1000.

Mg and Mn dihalide in activated form means the dihalide having a surface area larger than 3 m$^2$/g and/or the dihalide whose X-ray spectrum exhibits a broadening of the most intense diffraction lines characteristic of the normal, non-activated Mg and Mn halides.

Mg and Mn dihalides in activated form may be prepared according to various methods. One method consists in dissolving the halides in alcohols, ethers or other organic solvents and in subsequently removing most of the solvent by means of quick evaporation and finally in removing the remaining solvent at reduced pressure and at temperatures generally higher than 100° C, preferably ranging from 150° to 500° C.

Activated forms of Mg and Mn halides may be prepared also by fine co-grinding and generally through any other physical method, according to which the carrier particles are subjected to friction and/or shearing stresses.

Another method consists in reacting a hydrated Mg or Mn halide with an Al-trialkyl compound, in particular with Al-triisobutyl, in a molar ratio between Al-trialkyl and $H_2O$ present in the metal halide equal to or higher than 2.

The preferred method of activating the Mg and Mn halide consists in grinding the non-activated Mg or Mn halide, preferably in a ball mill, under dry conditions, in the absence of any inert diluent.

The alpha-olefins are polymerized in contact with the present catalysts under the conventional conditions. Polymerization is conducted at temperatures ranging from $-80°$ C. to 150° C, preferably from 40° to 100° C, operating at partial pressures of the alpha-olefins higher than the atmospheric pressure.

Polymerization can be conducted both in liquid phase, either in the presence or absence of an inert diluent, and in gas phase.

The alpha-olefins comprise in general olefins of formula $CH_2 = CHR$, wherein R is an alkyl radical containing from 1 to 6 carbon atoms. Propylene, butene-1, 4-methylpentene-1 are examples of such alpha-olefins. The process may be employed for polymerizing mixtures of alpha-olefins with smaller amounts of ethylene.

Some inert diluents are useful in the polymerization, for example, aliphatic hydrocarbons $C_4 - C_8$, such as n-hexane, n-heptane; cycloaliphatic hydrocarbons, such as cyclohexane, and aromatics such as benzene, toluene, xylene.

The regulation of the polymer molecular weight during the polymerization is effected according to the known techniques by operating, for instance, in the presence of hydrogen, or alkyl halides or organo-metal Zn- or Cd-compounds. The presence of hydrogen as molecular weight modifier, operating with the catalysts of the present invention, does not appreciably reduce the activity and/or stereospecificity of the catalysts.

The following examples are given to better illustrate the present invention, and are not intended to be limiting. Unless otherwise specified, the percentages indicated in the examples are by weight. The inherent viscosity of the polymers is measured in tetralin at 135° C, at a concentration of 0.25 g of polymer in 100 cc of solvent.

EXAMPLE 1

4.8591 g of anhydrous $MgCl_2$ (ground in a ball mill for 5 days), 4.8768 g of durene (2, 3, 5, 6-tetramethylbenzene), 2.6907 g of the $TiCl_4$ - ethyl benzoate complex in a 1:1 molar ratio were ground in a nitrogen atmosphere for 110 hours in a glass mill (having a 100 mm length and a 50 mm diameter), containing 550 g of stainless steel balls of 9.5 mm diameter.

0.1263 g of the mixture thus obtained (having a titanium content of 3.07% by weight) were suspended in a solution consisting of 0.82 g of Al $(C_2H_5)_3$ and of 0.48 g of ethyl p-methoxy benzoate in 50 cc of anhydrous and deaerated n-heptane; the suspension thus obtained was injected under a dry argon pressure into a stainless steel 3 l autoclave provided with magnetic stirrer, heated to a temperature of 65° C and containing 870 g of anhydrous propylene and 2 n. l. of dry hydrogen. Stirring was interrupted after 5 hours, the non-polymerized propylene was discharged from the autoclave. The product, in the form of a white powder, was extracted, which, after drying, amounted to 400g corresponding to a yield of 103,000 g of polymer per g of titanium employed.

The extraction with boiling n-heptane yielded a residue of 90.4%. The crude polymer inherent viscosity was 2.06 dl/g.

EXAMPLE 2

Example 1, was repeated, but using, for carrying out the grinding, 5.073 g of anhydrous $MgCl_2$, 4.9489 g of anthracene, 2.7833 g of the $TiCl_4$ - ethyl benzoate complex in a 1:1 molar ratio.

0.1057 g of the mixture thus obtained (having a titatium content of 3.96%) was used for polymerizing propylene, as described in Example 1. 390 g of polypropylene were thus obtained, corresponding to a yield of 120,000 g of polymer per gram of titanium employed. The residue of the extraction with boiling n-heptane was 89.7%. The crude polymer inherent viscosity was 1.95 dl/g.

EXAMPLE 3

Example 1 was repeated, but using, for effecting the grinding, 5.006 g of anhydrous $MgCl_2$, 5.067 g of naphthalene and 2.783 g of the $TiCl_4$-ethyl benzoate complex in a 1:1 molar ratio.

0.1173 g of the mixture thus obtained (having a titanium content of 3.04%) was employed for polymerizing the propylene, as described in Example 1. 354 g of polypropylene were thus obtained, corresponding to a yield of 99,000 g of polymer per gram of titanium employed. The residue obtained from the extraction with boiling n-heptane was 91%. The crude polymer inherent viscosity was 2.03 dl/g.

EXAMPLE 4

Example 1 was repeated, but using, for grinding, 4.489 g of anhydrous $MgCl_2$, 2.2533 g of $SiO_2$, 2.177 g of p. dichlorobenzene and 2.429 g of the 1:1 molar complex obtained from $TiCl_4$ and ethyl benzoate.

0.1085 g of the mixture thus obtained (having a titanium content of 3.0%) were used for polymerizing propylene as described in Example 1. 256 g of polypropylene were thus obltained, corresponding to a yield of 79,000 g of polymer per gram of titanium utilized. The residue resulting from the extraction with boiling n-heptane amounted to 90%. The crude polymer inherent viscosity was 1.92 dl/g.

EXAMPLE 5

Example 1 was repeated but using, for the grinding, 4.639 g of anhydrous $MgCl_2$, 4.699 g of hexachlorobenzene and 2.595 g of the 1:1 molar complex resulting from $TiCl_4$ and ethyl benzoate.

0.1040 g of the mixture thus obtained (having a titanium content of 3.04%) was utilized for polymerizing the propylene, as described in Example 1. 335 g of polypropylene were thus obtained, corresponding to a yield of 106,000 g of polymer per gram of titanium employed.

The residue resulting from the extraction with boiling n-heptane was 90%. The crude polymer inherent viscosity was 1.74 dl/g.

EXAMPLE 6

Example 1 was repeated but using, for the grinding, 5.58 g of a ground mixture of anhydrous $MgCl_2$ and anhydrous $B_2O_3$ (1:1 by weight), 1.33 g of acenaphthene, 2.52 g of the 1:1 molar complex resulting from $TiCl_4$ and ethyl benzoate. 0.112 g of the mixture thus obtained (having a titanium content of 3.79%) was employed for the polymerization of propylene as illustrated in Example 1. 190 g of propylene were thus obtained, corresponding to a yield of 45,000 g of polymer per gram of titanium employed. The residue deriving from the extraction with boiling n-heptane amounted to 89%. The crude polymer inherent viscosity was 1.65 dl/g.

EXAMPLE 7

Example 1 was repeated but using, for carrying out the grinding, 4,851 g of a ground mixture (1:1 by weight) made up of anhydrous $MgCl_2$ and of anhydrous $B_2O_3$, 2.454 g of anhydrous $MgCl_2$, 2.413 g of durene, 2.696 g of the 1:1 molar complex of $TiCl_4$ and ethyl p-tert-butyl benzoate.

0.1036 g of the mixture thus obtained (having a titanium content of 2.64%) was used for the polymerization of propylene, as illustrated in Example 1. 307 g of polymer were thus obtained, corresponding to a yield of 113,000 g of polymer per gram of titanium employed.

The residue resulting from the extraction with boiling n-heptane was 90%. The crude polymer inherent viscosity was 1.77 dl/g.

EXAMPLE 8

Example 1 was repeated, but in this case 5.031 g of anhydrous and ground $MgCl_2$, 4.9994 g of durene, 3.0416 g of the 1:1 molar complex of $TiCl_4$ and ethyl p. methoxy-benzoate were used for the grinding.

0.1464 g of the mixture thus obtained (having a titanium content of 3.01%) was used for propylene polymerization, as described in Example 1. 400 g of polypropylene were thus obtained, corresponding to a yield of 91,000 g of polymer per g of titanium employed.

The residue resulting from the extraction with boiling n-heptane amounted to 90%. The crude polymer inherent viscosity was 1.86 dl/g.

EXAMPLE 9

Example 1 was repeated, but using for the grinding 4.844 g of a ground mixture (1:1 by weight) of anhydrous $MgCl_2$ and anhydrous $B_2O_3$; 2.441 g of anhydrous $MgCl_2$; 2.391 g of durene; 2.8912 g of the 1:1 molar complex of $TiCl_4$ and ethyl p-methoxy benzoate.

0.1209 g of the mixture thus obtained (having a titanium content of 3.0%) was used for propylene polymerization, as described in Example 1. 330 g of polypropylene were thus obtained, corresponding to a yield of 91,000 g of polymer per gram of titanium employed.

The residue resulting from the extraction with boiling n-heptane was 90.5%. The crude polymer inherent viscosity was 1.92 dl/g.

EXAMPLE 10

Example 1 was repeated, but using in this case, for conducting the grinding, 4.869 g of $MgCl_2$, 4.803 g of acenaphthene and 2,969 g of the 1:1 molar complex of $TiCl_4$ and ethyl p-methoxy benzoate.

0.0982 g of the mixture thus obtained (having a titanium content of 3.05%) was employed for polymerizing propylene, as illustrated in Example 1. 170 g of polypropylene were thus obtained, corresponding to a yield of 57,000 g of polymer per gram of titanium employed. The residue resulting from the extraction with boiling n-heptane amounted to 86.7%. The crude polymer inherent viscosity was 1.65 dl/g.

EXAMPLE 11

Example 1 was repeated, but using, for the grinding, 4,907 g of anhydrous $MgCl_2$, 4.835 g of diphenyl, 2.963 a of the 1:1 molar complex of $TiCl_4$ and ethyl p-methoxy benzoate.

0.1344 g of the mixture thus obtained (having a titanium content of 3.03%) was used for propylene polymerization, as described in Example 1. 296 g of polypropylene were thus obtained, corresponding to a yield of 73,000 g of polymer per gram of titanium employed.

The residue resulting from the extraction with boiling n-heptane amounted to 89%. The crude polymer inherent viscosity was 1.95 dl/g.

EXAMPLE 12

Example 1 was repeated, but using, for the grinding, 4.385 g of anhydrous $MgCl_2$, 4.456 g of polyvinyl toluene (obtained by radicalic polymerization) and 2.414 g of the 1:1 molar complex of $TiCl_4$ and ethyl benzoate.

0.1151 g of the mixture thus obtained (having a titanium content of 3.0%) was employed to polymerize propylene as described in Example 1. 410 g of polypropylene were thus obtained, corresponding to a yield of 118,000 g of polymer per gram of titanium employed.

The residue resulting from the extraction with boiling n-heptane was 89%. The crude polymer inherent viscosity was 1.92 dl/g.

EXAMPLE 13

Example 1 was repeated, but using for the grinding, 4.378 g of anhydrous $MgCl_2$, 4.3710 g of polycarbonate (obtained by interface polycondensation between bisphenol and phosgene), 2.4466 g of the 1:1 molar complex of $TiCl_4$ and ethyl benzoate.

0.115 g of the mixture thus obtained (having a titanium content of 3.05%) was used for propylene polymerization, as described in Example 1. 155 g of polypropylene were thus obtained, corresponding to a yield of 44,000 g of polymer per gram of titanium employed.

The residue resulting from the extraction with boiling n-heptane was equal to 86.3%. The crude polymer inherent viscosity was 1.75 dl/g.

EXAMPLE 14

Example 1 was repeated, but in this case 5.088 g of $MgCl_2$, 5.054 g of high density polythene, 2.7382 g of the 1:1 molar complex of $TiCl_4$ and of ethyl benzoate were used for the grinding.

0.108 g of the mixture thus obtained (having a titanium content of 2.98%) was employed for polymerizing propylene, as illustrated in Example 1. 258 g of polypropylene were thus obtained, corresponding to a yield of 80,000 g of polymer per gram of titanium used.

The residue resulting from the extra action with boiling n-heptane was 88.5%. The crude polymer inherent viscosity was 1.61 dl/g.

EXAMPLE 15

Example 1 was repeated, but using in this case 4.794 g of anhydrous $MgCl_2$, 4.865 g of polystyrene (obtained by radicalic polymerization) and 2.681 g of the 1:1 molar complex of $TiCl_4$ and ethyl benzoate in carrying out the grinding.

0.112 g of the mixture thus obtained (having a titanium content of 3.07%) was utilized in propylene polymerization, as described in Example 1. 320 g of polypropylene were thus obtained, corresponding to a yield of 93,000 g of polymer per gram of titanium utilized.

The residue of the extraction with boiling n-heptane amounted to 90.5%. The crude polymer inherent viscosity was 2.17 dl/g.

EXAMPLE 16

Example 1 was repeated, but using in this case 4.451 g of anhydrous $MgCl_2$, 4.464 g of polymethyl methacrylate, 2.459 g of the 1:1 molar complex of $TiCl_4$ and ethyl benzoate in carrying out the grinding.

0.118 g of the mixture thus obtained (having a titanium content of 3.02%) was utilized for polymerizing propylene, as described in Example 1. 315 g of polypropylene were thus obtained, corresponding to a yield of 88,000 g of polymer kper gram of titanium employed.

The residue of the extraction with boiling n-heptane was 88%. The crude polymer inherent viscosity was 2.05 dl/g.

EXAMPLE 17

Example 1 was repeated, but using for the grinding 4.956 g of anhydrous $MgCl_2$, 4.961 g of polyamide (product obtained by condensation of fumaroyl chloride with trans-2, 5-dimethylpiperazine), 2.734 g of the 1:1 molar complex of $TiCl_4$ and ethyl benzoate.

0.115 g of the mixture thus obtained (having a titanium content of 3.02%) was employed in the polymerization of propylene as described in Example 1. 380 g of polypropylene were thus obtained, corresponding to a yield of 110,000 g of polymer per gram of titanium employed.

The residue of the extraction with boiling n-heptane amounted to 90%. The crude polymer inherent viscosity was 1.90 dl/g.

EXAMPLE 18

Example 1 was repeated, but using in this case for the grinding 4.31 g of anhydrous $MgCl_2$, 4.342 g of polypropylene (polypropylene residue from the extraction with heptane obtained in a run similar to that of Example 12) and 2.39 g of the 1:1 molar complex of $TiCl_4$ and ethyl benzoate.

0.112 g of the mixture thus prepared (having a titanium content of 3.03%) was employed for propylene polymerization, as described in Example 1. 356 g of polypropylene were thus obtained, corresponding to a yield of 105,000 g of polymer per g of titanium employed.

The residue obtained from the extraction with boiling n-heptane was 90.5%. The cruse polymer inherent viscosity was 1.92 dl/g.

EXAMPLE 19

Example 1 was repeated, but using in this case for the grinding 4.087 g of anhydrous $MgCl_2$, 4.062 g of polyvinylchloride and 2.20 g of the 1:1 molar complex of $TiCl_4$ and ethyl benzoate.

0.111 g of the mixture thus obtained (having a titanium content of 3%) was employed in propylene polymerization, as illustrated in Example 1. 330 g of polypropylene were thus prepared, corresponding to a yield of 99,000 g of polymer per gram of titanium utilized. The residue obtained from the extraction with boiling n-heptane was 90%. The crude polymer inherent viscosity amounted to 1.78 dl/g.

EXAMPLE 20

4.10 g of anhydrous $MgCl_2$, 2.17 g of $Cl_3TiOC_6H_5$, 3.80 g of durene were ground in a nitrogen atmosphere for 110 hours in a glass mill (length = 100 mm, diameter = 50 mm), containing 550 g of stainless steel balls having a 9.5 mm diameter.

0.0555 g of the mixture thus obtained (having a titanium content of 4.15% by weight) was suspended in a solution containing 0.655 g of $Al(C_2H_5)_3$ and 0.386 g of ethyl p-methoxy benzoate in 50 cc of anhydrous and deaerated n-heptane; the suspension thus obtained was injected, under a dry argon pressure, into a stainless steel autoclave having a 2 l capacity, provided with a magnetic stirring sytem, heated to a temperature of 65° C and containing 500 g of anhydrous propylene and 1.7 n.l. of dry hydrogen. Stirring was interrupted after 5 hours, the nonpolymerized propylene was discharged and from the autoclave a product, in the form of a white powder, was extracted, which, after drying, amounted to 265 g corresponding to a yield of 106,000 g of polymer per g of titanium employed.

By extraction with boiling n-heptane a residue of 88.3% was obtained. The crude polymer inherent viscosity was 2.88 dl/g.

EXAMPLE 21

Example 18 was repeated, but using in this case for the grinding 4.62 g of anhydrous $MgCl_2$, 4.46 g of durene, 1.41 g of $Cl_3TiOCH_2—CH(CH_3)_2$.

0.0532 g of the mixture thus obtained (having a titanium content of 2.86% by weight) was employed for polymerizing propylene as described in Example 18. 69 g of polypropylene were thus obtained, corresponding to a yield of 45,800 g of polymer per gram of titanium employed.

The residue resulting from the extraction with boiling n-heptane amounted to 91.6%. The crude polymer inherent viscosity was 2.86 dl/g.

EXAMPLE 22

Example 18 was repeated, but grinding was carried out in this case using 4.64 g of anhydrous $MgCl_2$, 3.90 g of durene, 1.85 of $Cl_3TiOC_6H_4 — pOCH_3$.

0.0658 g of the mixture thus prepared (having a titanium content of 3.04%) was employed for the propylene polymerization, as described in Example 18. 152 g of polypropylene were thus obtained, corresponding to a yield of 76,000 g of polymer per g of titanium employed.

The residue resulting from the extraction with boiling n-heptane was 87%. The crude polymer inherent viscosity was of 2.42 dl/g.

We claim:

1. In the process for the stereoregular polymerization of alpha-olefins of the formula $CH_2=CHR$, in which R is an alkyl radical containing from 1 to 6 carbon atoms, which process comprises polymerizing the alpha-olefins in contact with a catalyst prepared by mixing
   (a) a catalyst-forming component which is the addition and/or substitution product of an electron-donor compound (or a Lewis base) with an aluminum trialkyl, or the addition product of an electron-donor compound with an alkyl aluminum compound containing two or more aluminum atoms bound to one another through an oxygen or nitrogen atom, component (a) being characterized in that the organic aluminum compound combined with the electron-donor compound is comprised in the range from 0.01 to 1.0 mole per mole of the starting aluminum compound; with (b) a supported catalyst-forming component which is the product obtained by contacting a substance selected from the group consisting of bi-, tri- and tetravalent titanium compounds selected from the group consisting of $TiCl_4$;
$TiCl_3$;
$TiI_4$;
$Ti(OC_3H_7)Cl_3$;
$Ti(OC_4H_9)_2Cl_2$;
$3 TiCl_3 \cdot AlCl_3$;
$Ti[O-C(CH_3)=CH-CO-CH_3]_2Cl_2$;
$Ti[N(C_2H_5)_2]Cl_3$;
$Ti[N(C_6H_5)_2]Cl_3$;
$Ti(C_6H_5COO)Cl_3$;
$[N(C_4H_9)_4]_2TiCl_6$;
$[N(CH_3)_4]Ti_2Cl_9$;
$TiBr_4$;
$TiCl_3OSO_2C_6H_5$; and
$LiTi(OC_3H_7)_2Cl_3$, and addition compounds of such titanium compounds with an electron-donor, with a carrier consisting of an anhydrous active magnesium or manganese dihalide both the carrier and component (b) being characterized by having a surface area larger than 3 m²/g, or component (b) being characterized in thsat its X-rays powder spectrum does not show the diffraction lines which are most intense in the X-rays powder spectrum of the normal, non-active Mg or Mn dihalide, component (b) being further characterized in that the amount of Ti-compound present, expressed as Ti-metal, is less than 0.3 g-atoms per mole of the total amount of electrondonor compound present in combined form in the catalyst, the improvement consisting of adding, to the anhydrous Mg or Mn dihalide, a solid organic co-carrier selected from the group consisting of durene, anthracene, hexachlorobenzene, p-dichlorobenzene, acenaphthene, naphthalene and diphenyl, in an amount of from 10% to 90% by weight based on the combined weights of the Mg or Mn dihalide and said solid organic co-carrier.

2. The process of claim 1, in which the electron-donor compound of component (a) is selected from the group consisting of esters and diamines.

3. The process of claim 1, in which the Ti-compound used for preparing component (b) is an addition compound with an electron-donor.

4. The process of claim 1, in which the Ti-compound is contained in the carrier in an amount, expressed as Ti-metal, ranging fron 0.1 to 10% by weight.

5. The process of claim 1, in which the complex and/or reaction product indicated under (a) is prepared and then added to component (b).

6. The process of claim 1, in which the addition product of the Ti compound and electron-donor is preformed and then contacted with the carrier.

7. The process of claim 1, in which the support comprises a Ng dihalide.

8. The process of claim 1, in which the support comprises a Mn dihalide.

9. The process of claim 1, in which the Mg dihalide is Mg dichloride.

10. The process of claim 1, in which the solid organic co-carrier is durene.

11. The process of claim 1, in which the solid organic co-carrier is anthracene.

12. The process of claim 1, in which the solid organic co-carrier is acenaphthene.

13. The process of claim 1, in which the solid organic co-carrier is diphenyl.

* * * * *